(No Model.)
J. R. FRANCE.
TOILET OR OTHER ARTICLE OF PLASTIC MATERIAL.
No. 478,851. Patented July 12, 1892.
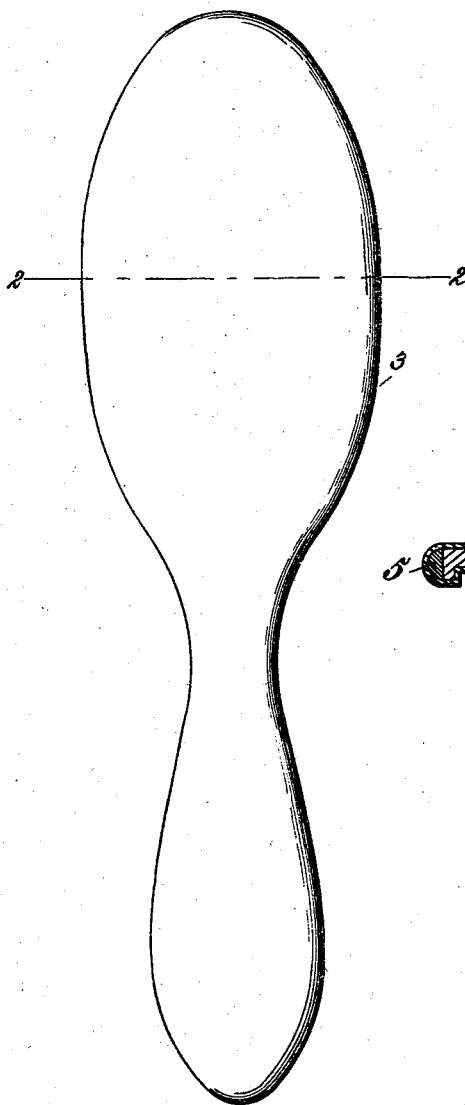
Witnesses.
Robert Pruitt,
J Harry Daly.
Inventor:
Joseph R. France.
By James L. Norris.
Atty.

UNITED STATES PATENT OFFICE.

JOSEPH R. FRANCE, OF NEW YORK, N. Y.

TOILET OR OTHER ARTICLE OF PLASTIC MATERIAL.

SPECIFICATION forming part of Letters Patent No. 478,851, dated July 12, 1892.

Application filed March 7, 1892. Serial No. 424,063. (No specimens.)

*To all whom it may concern:*

Be it known that I, JOSEPH R. FRANCE, a citizen of the United States, residing at New York, in the county of New York and State of New York, have invented new and useful Improvements in Toilet and other Articles of Plastic Material, of which the following is a specification.

This invention relates to new articles of manufacture composed of a composition base of plastic material covered on one or both sides with pyroxyline material, such as pyralin, zylonite, or celluloid.

The object of my invention is to avoid the presence of a line or stripe of a different color from the exterior covering caused during the pressing or molding operation by the outflow of the composition base at the miter joint or seam.

To accomplish this object, my invention consists, essentially, in an article of plastic material composed of a composition base having on one or more sides or parts a veneer sheet or coating of pyralin or the like and a strip of the same material around the edge of the composition base at or near the miter, as hereinafter described and claimed.

In the drawings the figures illustrate a hand-mirror back as one type of various articles for which my invention is useful.

Figure 1 is a plan view looking at the back of the mirror; and Fig. 2 is a sectional view taken on the line 2 2, Fig. 1.

I will now describe my invention with reference to a hand-mirror back, and such description will serve so that any one skilled in the art will readily understand how any other article made in dies can be produced in a similar manner and with the same advantages.

First, having cut out from a sheet of pyralin or zylonite or celluloid a piece 3, of about the shape of the mirror-back or the article to be made, and also having cut out from the composition base a piece 4 thereof, of about the shape and thickness of a mirror-back or the article to be made, I place in the bottom of the two halves of an open die the thin piece of pyralin and over it the composition base, and, closing the die, press it in the usual well-known manner. Any of the methods of heating the materials and dies before pressing can be adopted; but in practice I prefer to heat the dies on a steam-table, and then when well heated to place in them the thin piece of pyralin, warmed or heated in advance, and then the composition base and immediately to bring all under hydraulic pressure, and while under pressure leave until cold. My reason for heating the pyralin or zylonite first is because it requires more heat to flow it than does the composition base, and in so doing I obtain a closer and less-noticeable union of the two plastics at the miter. In consequence of the difference in the two plastics there will be a line or stripe at the miter of a different color, caused by the outflow (during the pressing operation) of the composition base at that point. To obviate this, a narrow strip 5 of the pyralin or other pyroxyline compound is placed at the edge of the composition base in such a manner that whatever overflow there is in the pressing this overflow shall be from the pyralin or similar compound. In this manner the line at the miter would not be apparent and would be identical with similar lines in articles pressed from blanks which are made entirely from pyroxyline compounds. Furthermore, the union of the thin sheet of pyroxyline compound is easier of accomplishment by this method. Care must be taken that the composition base is of the proper size. Otherwise the strip 5, placed around the blank in the manner described, would be useless and would go out with the overflow.

I have here mentioned only such things as are pressed in dies; but it will be understood that I do not confine myself to these, but include all articles that are made with a union of the two plastics and whether pressed together or combined by cementing or otherwise secured together.

I do not herein broadly claim an article of plastic material composed of a composition base faced, veneered, or coated on one or both sides with a pyroxyline compound, as such constitutes the subject-matter of my application for Letters Patent filed May 11, 1892, Serial No. 432,586.

Having thus described my invention, what I claim is—

As a new article of manufacture, an article of plastic material composed of a composition base having on one or more sides or parts a veneer sheet or coating of pyralin or the like and a strip of the same material round the edge of the composition base at or near the miter, substantially as described.

In testimony whereof I have hereunto set my hand and affixed my seal in presence of two subscribing witnesses.

JOSEPH R. FRANCE. [L. S.]

Witnesses:
RICHARD J. SICKELS,
C. HEINKE.